(12) United States Patent
Wittrock et al.

(10) Patent No.: US 9,561,470 B2
(45) Date of Patent: Feb. 7, 2017

(54) METHOD FOR THE PURIFICATION OF DIESEL ENGINE EXHAUST GASES

(71) Applicant: DEUTZ Aktiengesellschaft, Cologne (DE)

(72) Inventors: Meike Wittrock, Bergisch-Gladbach (DE); Ulf Klein, Much (DE); Gerald Leyh, Cologne (DE)

(73) Assignee: Deutz Aktiengesellschaft, Cologne (DE)

( * ) Notice: Subject to any disclaimer, the term of this patent is extended or adjusted under 35 U.S.C. 154(b) by 12 days.

(21) Appl. No.: 14/622,469

(22) Filed: Feb. 13, 2015

(65) Prior Publication Data

US 2015/0231565 A1  Aug. 20, 2015

(30) Foreign Application Priority Data

Feb. 14, 2014 (DE) .................. DE102014001880

(51) Int. Cl.
| | |
|---|---|
| *F01N 3/035* | (2006.01) |
| *F01N 3/20* | (2006.01) |
| *F01N 3/28* | (2006.01) |
| *B01D 53/94* | (2006.01) |

(52) U.S. Cl.
CPC ..... *B01D 53/9477* (2013.01); *B01D 2255/904* (2013.01)

(58) Field of Classification Search
CPC ........... F01N 3/035; F01N 3/20; F01N 3/206; F01N 3/2066; F01N 3/2882; B01D 53/9459; B01D 53/94; B01D 53/9477
See application file for complete search history.

(56) References Cited

U.S. PATENT DOCUMENTS

| | | | |
|---|---|---|---|
| 8,756,919 B2 * | 6/2014 | Hodgson | F01N 3/2066 60/286 |
| 2002/0031628 A1 | 3/2002 | Zumbrum et al. | |
| 2004/0098971 A1 | 5/2004 | Upadhyay et al. | |
| 2004/0118108 A1 * | 6/2004 | Ripper | B01D 53/90 60/286 |
| 2005/0031514 A1 | 2/2005 | Patchett et al. | |
| 2007/0119153 A1 | 5/2007 | Pierz et al. | |
| 2008/0264042 A1 * | 10/2008 | Khadiya | F01N 3/035 60/286 |
| 2009/0145117 A1 * | 6/2009 | Doring | F01N 13/011 60/286 |
| 2009/0211236 A1 | 8/2009 | Schwarzkopf | |
| 2009/0241521 A1 * | 10/2009 | Kim | B01D 53/9418 60/295 |

(Continued)

FOREIGN PATENT DOCUMENTS

| | | |
|---|---|---|
| DE | 4432577 | 3/1996 |
| DE | 103 48 800 | 6/2004 |

(Continued)

*Primary Examiner* — Timothy Vanoy
(74) *Attorney, Agent, or Firm* — Davidson, Davidson & Kappel, LLC

(57) ABSTRACT

A method in which the exhaust gas that is to be purified is passed through an exhaust-gas line containing a diesel oxidation catalyst (DOC) for the oxidation of residual gaseous hydrocarbons (HC) and carbon monoxide (CO) in order to form carbon dioxide ($CO_2$) and for the at least proportional oxidation of the nitrogen monoxide (NO) contained in the exhaust gas in order to form nitrogen dioxide ($NO_2$) is provided.

12 Claims, 2 Drawing Sheets

(56) References Cited

U.S. PATENT DOCUMENTS

| | | |
|---|---|---|
| 2010/0077739 A1 | 4/2010 | Rodman et al. |
| 2010/0175372 A1* | 7/2010 | Lambert ............ B01D 53/9472 60/297 |
| 2011/0064632 A1 | 3/2011 | Huang et al. |
| 2011/0083621 A1* | 4/2011 | Ogunleye ............... F01N 3/208 123/41.02 |
| 2011/0286903 A1 | 11/2011 | Andreasson et al. |
| 2012/0110986 A1 | 5/2012 | Vorsmann et al. |
| 2012/0117949 A1 | 5/2012 | Miebach |
| 2013/0167512 A1 | 7/2013 | Brueck et al. |
| 2015/0231564 A1 | 8/2015 | Wittrock |
| 2015/0283507 A1* | 10/2015 | Schraml ............... F01N 3/2066 423/212 |
| 2016/0003120 A1* | 1/2016 | Tsuchiya ............... F01N 3/2066 60/310 |

FOREIGN PATENT DOCUMENTS

| | | |
|---|---|---|
| DE | 102006049591 | 5/2007 |
| DE | 102005059581 | 6/2007 |
| DE | 10 2007 011 184 | 9/2008 |
| DE | 10 2007 029 674 | 1/2009 |
| DE | 10 2007 042 836 | 3/2009 |
| DE | 10 2009 009 538 | 8/2009 |
| DE | 10 2008 012 087 | 9/2009 |
| DE | 10 2009 025 135 | 12/2010 |
| DE | 102010039972 | 3/2011 |
| EP | 1054722 | 11/2000 |
| EP | 1054766 | 11/2000 |
| EP | 1698769 | 9/2006 |
| EP | 2 177 728 | 4/2010 |
| EP | 2 192 279 | 6/2010 |
| WO | WO 2010/139429 | 12/2010 |
| WO | WO 2012/022687 | 2/2012 |
| WO | WO2014/014399 | 1/2014 |

* cited by examiner

METHOD FOR THE PURIFICATION OF DIESEL ENGINE EXHAUST GASES

This claims the benefit of German Patent Application DE 10 2014 001 880.6, filed Feb. 14, 2014 and hereby incorporated by reference herein.

The invention relates to a method for the purification of diesel engine exhaust gases.

The power per unit of displacement provided by engines of the new generation is continuously increasing. As a result, especially in the application of lower performance levels, ever colder exhaust-gas temperatures occur at which it is no longer possible to ensure the proper operation of a "classic" exhaust-gas after-treatment system having an SCR catalytic converter located at a distance from the engine.

Especially in the low-load range, deposits stemming from the crystallization of urea and urea-derived products can hardly be avoided when a urea-water solution (HWL) that is not temperature-controlled is metered in. Over the course of prolonged operation in the lower partial-load range, the resulting deposits can lead to a blockage of the exhaust-gas system and thus to a failure of the devices. Moreover, an adequate nitrogen-oxide removal of the SCR system in the low-load range can no longer be ensured if, due to insufficient exhaust-gas temperatures, the urea-water solution in the exhaust gas cannot be fully processed to form the actual reducing agent, namely, ammonia.

BACKGROUND

In today's EAT systems according to the state of the art such as, for instance, systems according to European patent specification EP-B-1 054 722, this means that the volume of the SCR catalytic converters has to be increased in order to achieve adequate nitrogen-oxide removal rates. As a rule, however, this cannot be reconciled with the installation space available.

Furthermore, a limit value for the number of particles applies to the new engine models. These limit values can no longer be met without introducing a closed wall flow filter.

German patent document DE 103 48 800 discloses a method to control a reductant feed system comprising at least one heating element. Upstream, the feed system is connected to an SCR catalytic converter. During the air-assisted injection of the reductant into the feed system, an evaporated mixture of air and reductant is formed over the heated element, and this mixture is introduced into an exhaust-gas mixture that is entering the SCR catalytic converter. An aqueous urea solution is employed as the reductant. The entire feed system, including the mixing unit for the urea-water solution and air as well as the heating element or evaporator unit, is integrated downstream from the SCR catalytic converter into the exhaust-gas carrying pipe downstream from the engine outlet. The amount of heat necessary to evaporate the mixture of urea-water solution and air is generated electrically by a 12-volt battery current.

German patent document DE 10 2007 029 674 discloses an assembly for nitrogen oxide reduction in a gas stream containing oxygen, especially in an exhaust-gas system of an internal combustion engine, comprising an SCR catalytic converter arranged in a gas line that carries nitrogen oxide and oxygen, a conversion reactor with which a solution containing an ammonia precursor is converted into an ammonia solution, and an evaporator unit configured as a separate component, which is located downstream from the conversion reactor and in which the ammonia solution is evaporated upstream from the SCR catalytic converter before being fed into the gas line. The conversion of the solution containing an ammonia precursor (preferably a urea-water solution) into an ammonia solution takes place according to the invention using microwaves. Upstream from the evaporator unit configured as a separate component, there can be a heat exchanger in order to heat up the ammonia solution so as to reduce the energy needed for the evaporation in that, for instance, the heat of the exhaust-gas return line is used. The evaporator itself is an electrically operated heating element.

German patent document DE 10 2007 042 836 discloses a device for the after-treatment of the exhaust gas of a motor vehicle using a liquid that releases ammonia, for example, a urea-water solution, comprising a reservoir to store the liquid, whereby a temperature-control device is provided for purposes of regulating the temperature of the liquid. In order to cool the liquid, the temperature-control device is associated with a cooling circuit of the motor vehicle. This can be the cooling circuit of the internal combustion engine or an air-conditioning circuit. The temperature-control device is configured as a separate component. Thanks to the temperature-control device, the liquid can be heated, thus preventing it from freezing, or else the liquid can be heated to a favorable temperature level that yields an excellent purification of the exhaust gas.

German patent document DE 10 2009 009 538 discloses a system to regulate the temperature of a fluid additive, preferably a urea-water solution, for the exhaust-gas system of an internal combustion engine, said system being characterized by means to bring about a heat exchange between the additive and a coolant circuit of a coolant installation, especially of an air-conditioning unit.

The development described in German patent document DE 10 2007 011 184 is based on the objective of further reducing the emissions of internal combustion engines, especially of diesel engines, and minimizing the installation space needed to treat the exhaust gas. For purposes of achieving this objective, a heat exchanger is disclosed for cooling the exhaust gas from an internal combustion engine of a motor vehicle in order to return the exhaust gas to the internal combustion engine. For cooling purposes, this heat exchanger has at least a first flow channel through which at least a first fluid flows, and at least a second flow channel through which a second cooling fluid flows, and this heat exchanger also has a housing to accommodate the at least one first flow channel and the at least one second flow channel. The housing has at least one inflow section through which the second fluid flows into the heat exchanger and at least one outflow section through which the second fluid flows out of the heat exchanger. The heat exchanger is characterized by at least one device that converts a liquid urea solution into at least ammonia gas.

International patent WO 2012/022687 discloses a method for operating an exhaust-gas treatment device having at least one reservoir for a reducing agent and at least one feed device for the reducing agent, whereby the method encompasses at least the following steps: a) checking the filling level of the at least one reservoir; b) checking the current exhaust-gas mass flow; c) adding reducing agent whenever the filling level of the at least one reservoir falls below a minimum filling level and the exhaust-gas mass flow is within a low-load range. In a special embodiment, one of the following actions is carried out in step c): heating at least the exhaust-gas mass flow or the reducing agent and feeding in reducing agent. In this process, the heat feed leading all the way to the reducing agent can be ensured or improved by external electric heaters.

German patent document DE 10 2009 025 135 discloses a device for evaporating a urea-water solution, comprising a conveying channel for the urea-water solution extending through at least a first zone and a second zone in order to introduce thermal energy, whereby the two zones can be heated separately from each other and, in the second zone, the conveying channel at first has a meandering course in a second inlet area, and subsequently a straight course. In the first zone, the urea-water solution is preheated to a temperature within the range from 100° C. to 180° C. [212° F. to 356° F.], while in the second zone, it is evaporated at a temperature ranging from 420° C. to 490° C. [788° F. to 914° F.].

German patent document DE 10 2008 012 087 discloses an evaporator unit for generating a gas stream containing ammonia out of a urea-water solution, said unit being likewise configured as a separate component.

Industrial engines according to the state of the art are typically operated with catalytically active exhaust-gas after-treatment (ANB) systems according to the above-mentioned European patent EP-B 1 054 722—or also called "SCR® systems" consisting of DOC/(c)DPF+SCR/ASC where a urea-water solution (HWL) is metered in upstream from the SCR/ASC catalytic converter—in order to comply with the applicable emission regulations (Tier 4 Final (US)/Stage IV (EU) and subsequent regulations).

In order for the exhaust-gas after-treatment system to be able to operate with the requisite cleaning efficiency, minimum exhaust-gas temperatures and catalyst operating temperatures of 230° C. [446° F.] or more are necessary.

In low-load operating states, the required minimum exhaust-gas temperatures can only be provided by means of engine-related heating measures (for instance, throttling the engine). The energy that is introduced into the exhaust gas in order to attain the requisite exhaust-gas temperatures is no longer available to the drive train. This translates into a diminished degree of drive efficiency for the engine and into greater fuel consumption and thus also increased $CO_2$ emissions.

Regeneration of the closed diesel particulate filter has a very detrimental effect on fuel consumption. Exhaust-gas temperatures of about 600° C. [1112° F.] are needed so that the soot deposited in the filter can be burned off in a controlled manner. In order to achieve such temperatures, in addition to the passive regeneration, as a rule there is a need to employ active measures such as, for example, additional fuel injection and exothermal conversion of the resultant unburned hydrocarbons on the DOC or else active regeneration measures, for instance, fuel-operated burners according to European patent applications EP-A 2 177 728, EP-A 2 192 279 or international patent document WO 2010/139429.

For the operation of the SCR system, a urea-water solution containing 32.5% urea is typically used as the reducing agent. In order to release ammonia from this, 67.5% of the water first has to be evaporated and the urea has to be hydrolytically converted into ammonia and $CO_2$.

SUMMARY OF THE INVENTION

In today's SCR systems, the aqueous urea solution (urea-water solution [HWL], brand name AdBlue®) needed to generate ammonia as the reducing agent is injected in a liquid, non-temperature-controlled state into the exhaust gas upstream from the SCR catalytic converter. The amount of heat needed to completely convert the urea-water solution into the gas phase, accompanied by the (quantitative) release of ammonia (=urea processing), has to be provided in its entirety by the hot exhaust gas.

Particularly at low-load operating points, however, the amount of heat contained in the exhaust gas is often not sufficient to completely process the injected urea-water solution necessary for the complete reduction of the nitrogen oxides that are likewise present in the exhaust gas. This results in deposits (crystallization) of urea and urea-derived products such as isocyanic acid, cyanuric acid and melamine in the exhaust-gas system, which might cause a complete blockage of the exhaust-gas system as well as conversion losses in the SCR reaction due to inadequate provision of the stoichiometric amount of ammonia needed for the nitrogen oxide reduction.

It is an objective of the present invention to provide a method for the purification of diesel engine exhaust gases which does not have the above-mentioned drawbacks of today's methods, especially during operation of the internal combustion engine in the low-load range, and which is characterized by improved energy efficiency while concurrently attaining the best possible cost-effectiveness for the entire system.

A method is provided for the purification of diesel engine exhaust gases comprising the following steps:

a) the exhaust gas that is to be purified is passed through a diesel oxidation catalyst (DOC) for the oxidation of residual gaseous hydrocarbons (HC) and carbon monoxide (CO) in order to form carbon dioxide ($CO_2$) and for the at least proportional oxidation of the nitrogen monoxide (NO) contained in the exhaust gas in order to form nitrogen dioxide ($NO_2$);

b) a urea-water solution (HWL) that has been preconditioned in the engine, that is to say, heated up to 80° C. to 90° C. [176° F. to 194° F.], is added to the exhaust gas resulting from step a) and ammonia is released from the added urea through the modality of thermolysis and hydrolysis;

c) the exhaust gas resulting from step b) is passed through an SCR catalytically activated particulate filter (SDPF) in order to reduce the particles contained in the exhaust gas as well as the nitrogen oxides contained in the exhaust gas;

d) the exhaust gas resulting from step c) is passed through a selective ammonia slip catalyst (ASC) in order to reduce the residual contents of ammonia.

The urea-water solution is preferably preconditioned in the engine by means of the device disclosed in German patent document 10 2014 001 879.2.

Metering in the urea-water solution (HWL) that has been conditioned, that is to say, preheated to a temperature of 80° C. to 90° C. [176° F. to 194° F.] in the exhaust-gas system, makes it possible, first of all, for the metering in to be carried out at lower exhaust-gas temperatures (180° C. to 200° C. [356° F. to 392° F.]) than in the case of conventional metering methods (200° C. to 230° C. [392° F. to 446° F.]). Secondly, since less thermal energy needs to be fed in to process the urea-water solution into ammonia than is the case with conventional systems, this advantage can be utilized in order to shorten the mixing segment upstream from the SDPF or from the SCR catalytic converter rather than in order to lower the metering threshold temperature.

The exhaust-gas after-treatment system arranged on the engine downstream from the turbine comprises a DOC, a device for metering in the urea-water solution, an SCR catalytically activated particulate filter (SDPF) and an ammonia oxidation catalyst as well as optionally between an SDPF and an ammonia oxidation catalyst (also an ammonia slip catalyst ASC) a second SCR catalytic converter.

Owing to the (partial) integration of volumes of the SCR catalytic converter into the particulate filter, the exhaust-gas after-treatment system can be smaller than in conventional systems. This leads to improved heating characteristics of the exhaust-gas after-treatment system following a cold start and also to considerably lower heat losses via the exhaust-gas system. Moreover, there are also advantages in terms of space. The SCR catalytic converter, which is arranged downstream from the particulate filter in the flow direction of the exhaust gas, is employed selectively, namely, whenever the SCR volume that can be integrated into the particulate filter is not sufficient to ensure an $NO_x$ conversion rate >97% in the entire system over the running time (8000 operating hours).

Especially preferably, the method encompasses a passive regeneration concept for the SCR catalytically activated particulate filter (SDPF) which is still described below. An additional standstill regeneration of the particulate filter takes place within the scope of the servicing and so does the monitoring of the counter-pressure of the exhaust gas via the SDPF, so that so-called emergency standstill regeneration procedures can be carried out between the service intervals if the soot-regeneration rates are insufficient.

In especially preferred embodiments of the method, the SCR catalytically activated particulate filter (SDPF) is operated with a passive filter regeneration concept. This involves burning off the deposited soot according to the so-called CRT® reaction, in which the deposited soot particles are oxidized with $NO_2$ that is generated in the first step of the method via the DOC arranged upstream from the SDPF.

CRT® reaction: $C_n + 2nNO_2 \rightarrow nCO_2 + 2nNO$. 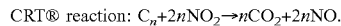

This CRT® reaction competes with the SCR reaction. When it comes to the SCR reaction, there are three reaction mechanisms that transpire at different reaction rates (RG):

standard SCR: $4NO + 4NH_3 + O_2 \rightarrow 4N_2 + 6H_2O$   medium reaction rate 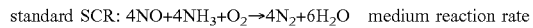

fast SCR: $NO + NO_2 + 2NH_3 \rightarrow 2N_2 + 3H_2O$   high reaction rate 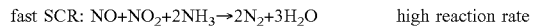

slow SCR: $6NO_2 + 8NH_3 \rightarrow 2N_2 + 12H_2O$   low reaction rate 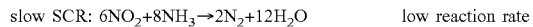

For purposes of providing sufficient $NO_2$ for the soot burn-off needed for the passive regeneration of the particulate filter, the upstream DOC has to provide more than 50% $NO_2$ in the $NO_x$ at operating points up to an exhaust-gas temperature of 350° C. to 375° C. [662° F. to 707° F.]. If the "CRT® reaction" transpires more quickly than the "slow SCR reaction", the $NO_2$ excess is available for the soot burn-off, thus ensuring a passive regeneration of the particulate filter.

A DOC operating temperature above approximately 300° C. falls outside of the kinetically controlled range. Then, the $NO_2$ concentration that can be generated in the exhaust gas by means of the catalytic converter is no longer only a function of the capacity of the catalytic converter, but rather, it is a function of the position of the thermodynamic equilibrium. At temperatures of more than 400° C. [752° F.], $NO_2$ concentrations of more than 50% in the $NO_x$ can no longer be generated.

Soot oxidation with $NO_2$ already sets in at 250° C. [482° F.]. Above 300° C. [572° F.], a passive regeneration of the particulate filter is possible with a high degree of operational reliability (source: C. Hagelücken et al., "Autoabgaskatalysatoren" [exhaust-gas catalytic converters for vehicles], $2^{nd}$ edition, published by expert Verlag, 2005, page 102). Under these boundary conditions, the competition between the SCR reaction and the "CRT® reaction" can be managed if adequately high $NO_2$ concentrations are provided.

If the amount of $NO_2$ provided by the DOC is not enough to productively resolve the competition situation between the SCR reaction on the one hand and the soot regeneration on the other hand, the possibility exists to limit the $NO_x$ removal efficiency of the SCR catalytically activated filter by restricting the amount of reducing agent that is metered in, so as to ensure a sufficient passive regeneration of the particulate filter. In this case, in an alternative embodiment, a second metering site for a urea-water solution upstream from a downstream (additional) SCR catalytic converter is provided in an alternative embodiment. By means of this second metering site, preconditioned—that is to say, heated to 80° C. to 90° C. [176° F. to 194° F.]—urea-water solution (HWL) is fed into the exhaust gas resulting from step c), so that the requisite $NO_x$ removal efficiency >97% in the entire system is ensured.

Another advantageous embodiment puts forward an industrial engine with a catalytically active exhaust-gas after-treatment (ANB) consisting of DOC+DPF+SCR/ASC whereby, instead of a device for metering a urea-water solution into the exhaust gas that is to be purified, a device for metering in gaseous ammonia is employed. In such an embodiment, the processing of the urea to form ammonia takes place in a reactor installed on the engine, a process in which a urea-water solution is fed as the educt to the reactor and in which a catalytic method employing thermolysis of the urea to form isocyanic acid and ammonia followed by hydrolysis of the resultant isocyanic acid to form ammonia and $CO_2$ is carried out in order to process the urea to form ammonia independently of the operating conditions prevalent in the exhaust-gas line.

The temperature threshold for metering in the reducing agent can be lowered to well below 200° C. to 230° C. [392° F. to 446° F.], preferably to temperatures within the range from 120° C. to 180° C. [248° F. to 356° F.], by removing the urea processing to form the ammonia from the exhaust-gas system and by metering the ammonia directly into the exhaust-gas after-treatment system.

The limitation of the above-mentioned lower temperature metering threshold falls within the range of the operating temperature window of the SCR catalytic converter. Metering in gaseous ammonia eliminates the risk of crystallization of urea and urea-derived products such as isocyanic acid, cyanuric acid and melamine that can result from the incomplete degradation of urea and that can lead to a complete blockage of the exhaust-gas system if the operating temperatures are too low. With this method, there is likewise no limitation in the $NO_x$ removal efficiency due to incomplete processing of the urea to form ammonia. Overdosing the reducing agent in order to compensate for incomplete urea processing at low-load operating points becomes superfluous. It is possible to reduce the ASC and/or to completely avoid the ammonia secondary emission of the (permissible) 10 Vppm on average over time without ASC.

BRIEF DESCRIPTION OF THE DRAWINGS

Embodiments of the invention as well as the technical circumstances will be explained below on the basis of the figures. It should be pointed out here that the invention is not restricted to the subject matter of the figures. The following is shown schematically.

DETAILED DESCRIPTION

Figure 1:
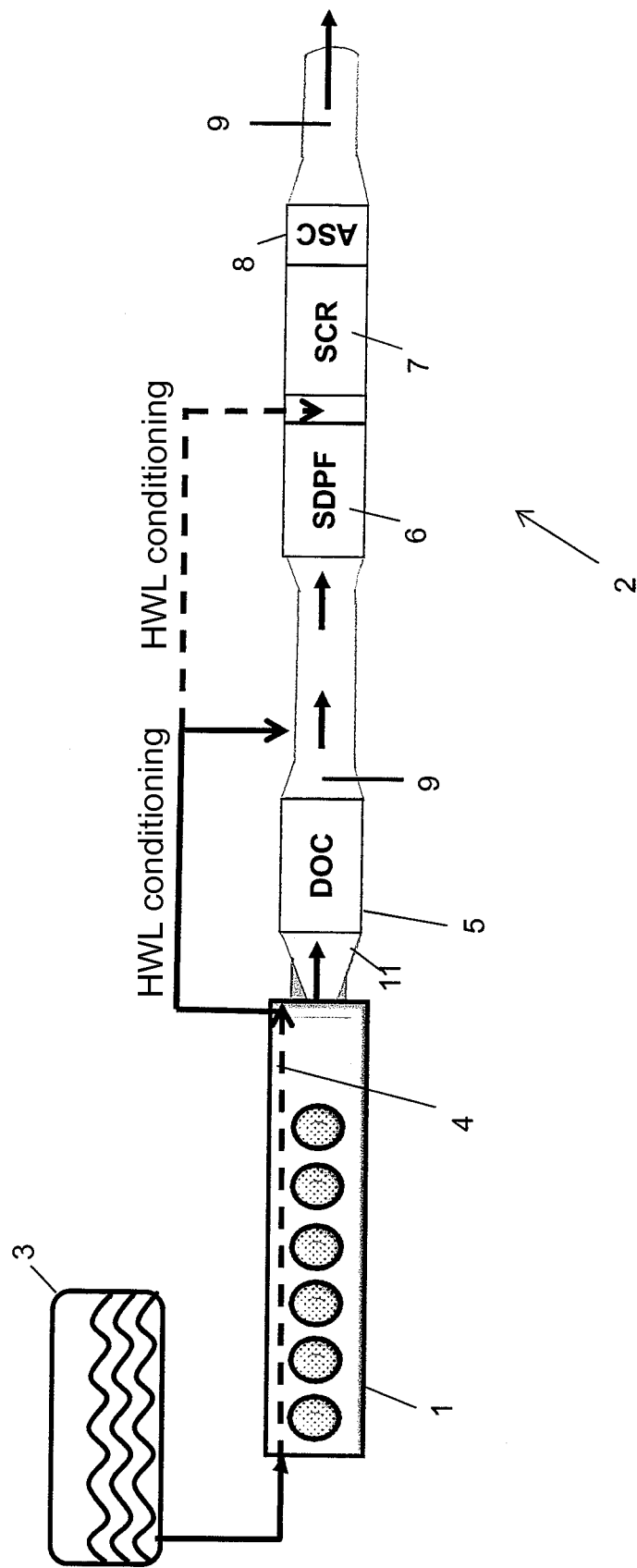
FIG. 1 a preferred configuration variant of the device for carrying out the method according to an embodiment of the invention.

FIG. 1 shows an internal combustion engine 1 comprising an exhaust-gas line 2 and a urea-water solution tank 3. A $NO_x$ sensor 9 and a urea-water solution feed device that is supplied by the urea-water solution heat exchanger 14 (FIG. 2) are arranged in the exhaust-gas line 2 between the DOC 5 and the SDPF 6 in the flow direction of the exhaust gas. The urea-water solution heat exchanger 14 can also supply the urea-water solution feed device with urea-water solution between the SDPF 6 and the SCR 7. An ammonia slip catalyst (ASC) 8 is located downstream from the SCR 7 in the flow direction of the exhaust gas. At the end of the exhaust-gas line 2, there is a $NO_x$ sensor 9. In an alternative configuration, it is provided that the urea-water solution heat exchanger 14 is arranged essentially in a double-walled exhaust-gas pipe 11 that has two $NO_x$ sensors 9, whereby one $NO_x$ sensor 9 is situated between the DOC 5 and the SDPF 6, while the other is behind the ASC 8.

Figure 2:
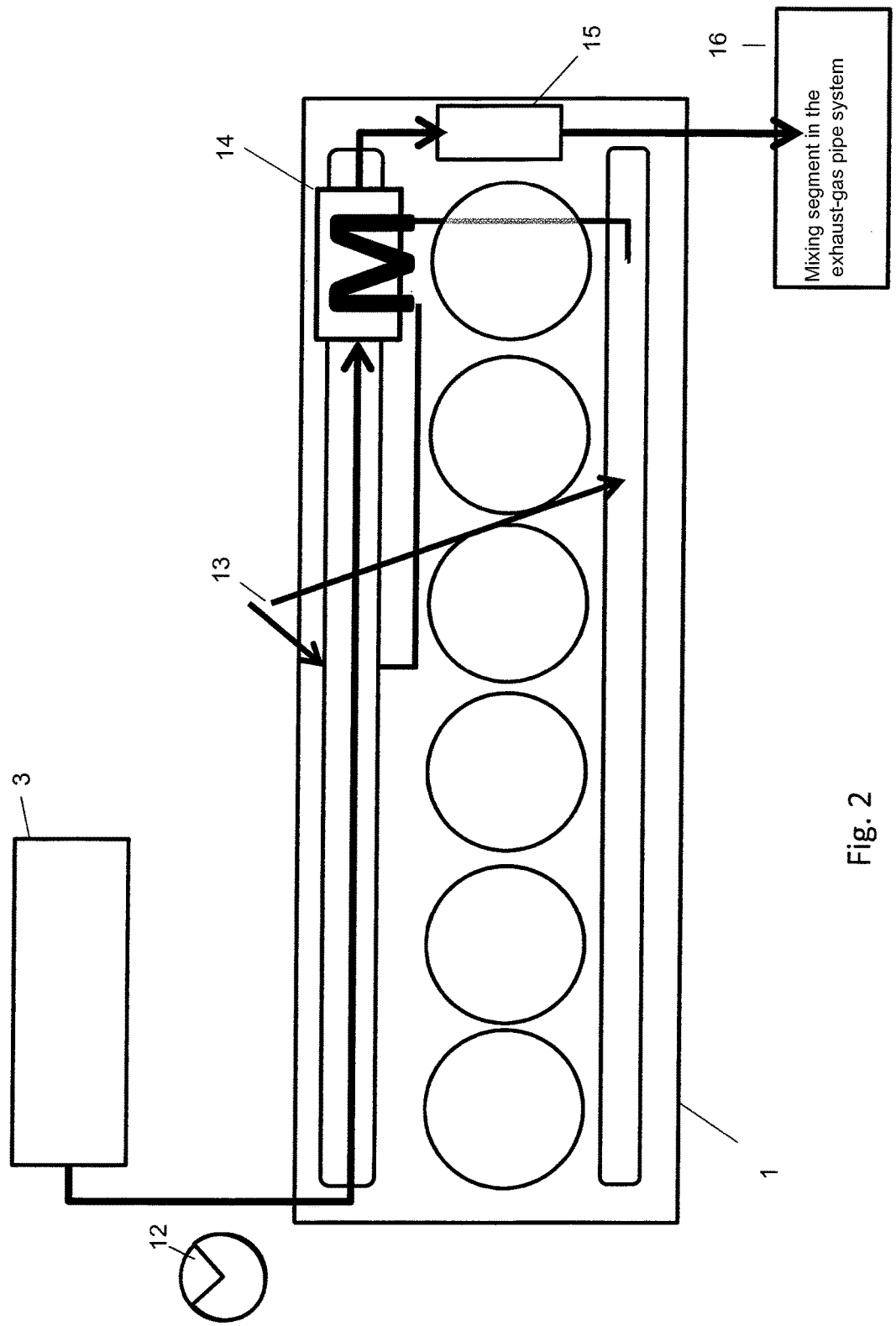
FIG. 2 the crankcase of an internal combustion engine with an integrated urea-water solution (HWL) heat exchanger.

FIG. 2 shows a crankcase of an internal combustion engine 1 with a urea-water solution heat exchanger 14 integrated into the cooling circuit or into the water cooling jacket 13. The urea-water solution is held in the tank 3 located in the area of the internal combustion engine. The urea-water solution is conveyed by means of a liquid-urea pump 12 into the area of the crankcase of the internal combustion engine 1 that carries the cooling water, where the urea-water solution heat exchanger 14 is located, thereby being heated by the urea-water solution. In an alternative configuration, it is provided that the urea-water solution heat exchanger 14 is arranged in the cylinder head of the internal combustion engine 1. After the heated urea-water solution leaves the urea-water solution heat exchanger 14, the liquid-urea pump 12 pumps it into the metering device 15. After the urea-water solution leaves the metering device 15, it reaches the mixing segment in the exhaust-gas pipe system 16, where it is further heated.

If necessary, additional volumes of the SCR catalytic converter can be advantageously integrated between the SCR-coated particulate filter and the ammonia oxidation catalyst. In this case, the ASC is installed on the SCR catalytic converter as a downstream zone. Owing to the (partial) integration of the volume of the SCR catalytic converter into the particulate filter, the exhaust-gas after-treatment system can still be considerably smaller than that of a conventional system according to European patent specification EP-B 1 054 766.

Metering preconditioned urea-water solution into the exhaust-gas line does not only allow the metering in to take place at lower exhaust-gas temperatures than in the case of conventional metering methods. Since less thermal energy than in conventional systems has to be fed in for purposes of processing the urea-water solution to form ammonia, this advantage can be utilized in order to shorten the mixing segment while the metering temperature threshold is not lowered.

Systems with SCR-coated filters, which are disclosed in the state of the art primarily for automotive applications, are typically regenerated actively, that is to say, by means of fuel post-injection and exothermal oxidation of the resultant hydrocarbons via a diesel oxidation catalyst situated upstream from the filter. In the method according to embodiments of the invention, a passive regeneration of the particulate filter should take place. This calls for sufficient amounts of $NO_2$ in the exhaust gas upstream from the particulate filter. Consequently, the upstream oxidation catalyst has to have high NO— oxidation rates, so that an $NO_2/NO_x$ ratio >0.5 is present in the exhaust gas upstream from the SCR-coated particulate filter. In this case, it can be assumed that only $NO_2$—which is present at a ratio of 1:1 in the exhaust gas upstream from the SCR-coated filter—reacts during the SCR reaction (close attention must be paid to the different reaction rates of "fast SCR"). Fractions of $NO_2$ going beyond this value are available for the soot burn-off according to the CRT® effect.

At less optimal operating temperatures, in an alternative embodiment, a second urea-water solution metering site can be advantageously arranged between the SCR-coated particulate filter and an SCR/ASC located downstream. In order to ensure a comprehensive passive regeneration, a sub-stoichiometric amount of reducing agent is provided upstream from the SCR-coated filter. The residual $NO_x$ removal takes place after a second injection of urea-water solution in the downstream SCR/ASC catalytic converter.

The term selective catalytic reduction (SCR) designates a technique for the reduction of nitrogen oxides present in the exhaust gases of combustion systems, garbage incineration plants, gas turbines, industrial systems and engines. The chemical reaction on the SCR catalytic converter is selective, that is to say, preferably the nitrogen oxides (NO, $NO_2$) are reduced, whereas undesired secondary reactions (such as, for instance, the oxidation of sulfur dioxide to form sulfur trioxide) are largely suppressed.

At the end of the reaction, there is a need for ammonia ($NH_3$) that is released from the urea-water solution admixed to the exhaust gas. The products of this reaction are water ($H_2O$) and nitrogen ($N_2$). From a chemical standpoint, this reaction is a comproportionation of the nitrogen oxides with ammonia to form nitrogen. There are different types of catalysts. One type consist essentially of titanium dioxide, vanadium peroxide and tungsten dioxide. Another type uses zeolites.

The method according to embodiments of the invention puts forward the integration of at least part of the volume of the SCR catalytic converter into the particulate filter volume through the use of an SCR catalytically activated particulate filter.

Moreover, the method according to an embodiment of the invention puts forward the preconditioning the urea-water solution (HWL) on hot engine parts such as, for example, the cooling fins of an air-cooled internal combustion engine in a device for preconditioning the urea-water solution. Another advantageous embodiment provides that the preconditioning or conditioning of the urea-water solution takes place in the area of the high-energy coolant and/or lubricant flows.

In automotive technology, the SCR method is employed in order to lower nitrogen oxide emissions in diesel vehicles. Thanks to this technology, utility vehicles are able to meet the Euro-V standard, agricultural machinery can meet the Tier 3b standard, and passenger cars can meet the very strict American BINS exhaust-gas standard as well as the Euro-6 standard. This technology is also used to comply with the exhaust-gas standards US Tier 4 final and EU Stage IV.

The ammonia needed for the SCR reaction is not used directly, in other words, in pure form, but rather, it is generated in the exhaust-gas system from a 32.5%-aqueous urea solution. The composition of the urea-water solution is regulated in German standard DIN 70070. This aqueous solution is injected into the exhaust-gas line upstream from SCR catalytic converter, for example, by means of a metering pump or injector. Thermolysis and a hydrolysis reaction then convert the urea-water solution into ammonia and $CO_2$. The ammonia thus generated can react with the nitrogen oxides in the exhaust gas in a special SCR catalytic converter at the appropriate temperature. The amount of injected urea is a function of the nitrogen oxide emissions of the engine and thus of the momentary rotational speed and the torque of the engine. The consumption of urea-water solution amounts to approximately 2% to 8% of the amount of diesel fuel used, depending on the raw emissions of the engine. For this reason, the appropriate tank volume has to be available. In order to attain high $NO_x$-reduction rates, it is important for a correct ratio of the urea-water solution (AdBlue®) to be metered into the nitrogen oxide emissions of the engine. Since SCR catalytic converters can only store $NH_3$ up to a certain limit, the average metered amount has to correspond to the $NO_x$ emission. If the amount metered in is too low, the efficiency of the nitrogen oxide reduction is reduced, whereas if too much urea is metered in, the ammonia formed from it cannot react with the $NO_x$ and can escape into the environment. Since ammonia has a pungent smell that can already be perceived at very low concentrations, an overdose would lead to unpleasant odor formation in the vicinity of the vehicle. A remedy for this consists in installing an oxidation catalyst downstream from the SCR catalytic converter. In case of an ammonia overdose, the oxidation catalyst converts the $NH_3$ back into nitrogen and water. Another possibility to avoid so-called ammonia slip is to design the catalytic converter larger so as to obtain a certain storage function.

Thermolysis is a chemical reaction in which an educt is degraded into several products by heating it. In contrast to thermal decomposition (=pyrolysis), thermolysis is systematically employed to prepare defined products or reactive intermediate stages.

Hydrolysis is the splitting of chemical compounds with water. The following applies:
thermolysis of urea:

$$(NH_2)_2CO \rightarrow NH_3 + HNCO \quad \text{(isocyanic acid)}$$

hydrolysis of the resultant isocyanic acid:

$$HNCO + H_2O \rightarrow NH_3 + CO_2$$

reduction of the nitrogen oxides:

$$4NH_3 + 4NO + O_2 \rightarrow 4N_2 + 6H_2O \quad \text{("standard SCR")}$$

$$2NH_3 + NO + NO_2 \rightarrow 2N_2 + 3H_2O \quad \text{("fast SCR")}$$

$$4NH_3 + 3NO_2 \rightarrow 3.5N_2 + 6H_2O \quad \text{("slow SCR")}$$

The nitrogen oxide reduction takes place without altering the engine combustion and thus retains the very good efficiency of diesel engines.

LIST OF ABBREVIATIONS

AdBlue 32.5%-aqueous urea solution
ANB exhaust-gas after-treatment
ASC ammonia slip catalyst
CRT continuous regeneration trap
CSF particulate filter with a coating for the oxidation of exhaust-gas components
DOC diesel oxidation catalyst
DPF diesel particulate filter
$NH_3$ ammonia
$NO_x$ sum of the nitrogen oxides (NO, $NO_2$, $N_2O$, etc.) that are generated during the combustion in engines
RG reaction rate
SCR selective catalytic reduction
SDPF diesel particulate filter with an SCR-active coating

LIST OF REFERENCE NUMERALS 1 internal combustion engine
2 exhaust-gas line
3 urea-water solution tank
5 DOC
6 SDPF
7 SCR
8 ASC
9 $NO_x$ sensor
10 cylinder head
11 double-walled exhaust-gas pipe
12 liquid urea pump
13 water cooling jacket in the crankcase
14 heat exchanger, spiral heat exchanger, shell and tube heat exchanger heat exchanger
15 metering device
16 mixing segment

What is claimed is:

1. A method for the purification of diesel engine exhaust gases, comprising:
    a) passing an exhaust gas to be purified through a diesel oxidation catalyst for oxidation of residual gaseous hydrocarbons and carbon monoxide in order to form carbon dioxide and for an at least proportional oxidation of nitrogen monoxide contained in the exhaust gas in order to form nitrogen dioxide;
    b) adding a urea-water solution that has been preconditioned in a urea-water solution heat exchanger integrated into a crankcase of the engine is added to the exhaust gas resulting from step a) and ammonia is released from the added urea through thermolysis and hydrolysis, the preconditioned urea-water solution having been heated up to 80° C. to 90° C. [176° F. to 194° F.] in the engine;
    c) passing the exhaust gas resulting from step b) through an SCR catalytically activated particulate filter in order to reduce the particles contained in the exhaust gas as well as the nitrogen oxides contained in the exhaust gas; and
    d) passing the exhaust gas resulting from step c) through a selective ammonia slip catalyst in order to reduce the residual contents of ammonia.

2. The method as recited in claim 1 further comprising, before the exhaust gas resulting from step c) is passed through the selective ammonia slip catalyst in step d), passing the exhaust gas through an additional SCR catalytic converter situated between the SCR catalytically activated particulate filter and the ASC.

3. The method as recited in claim 2 further comprising feeding preconditioned urea water solution in the exhaust gas resulting from step c) at a second meter site between the SCR catalytically activated particulate filter and the downstream additional SCR catalytic converter, the preconditioned urea water solution having been heated to 80° C. to 90° C. [176° F. to 194° F.].

4. The method as recited in claim 3 wherein the NOx removal efficiency of the SCR catalytically activated filter is limited by restricting the amount of urea-water solution that is metered in.

5. The method as recited in claim 2 wherein the SCR catalytically activated particulate filter is operated with a passive filter regeneration concept.

6. The method as recited in claim 1 wherein the fraction of NO2 generated in step a) that is present in the NOx in the exhaust gas resulting from step a) amounts to more than 50%.

7. The method as recited in claim 1 wherein the SCR catalytically activated particulate filter is operated with a passive filter regeneration concept.

8. The method as recited in claim 7 wherein the soot particles deposited in the SDPF are oxidized at least proportionally with NO2 that was generated in step a).

9. The method as recited in claim 1 wherein the exhaust gas in step b) is at a temperature lower than conventional metering methods, in which the temperature is 200° C. to 230° C. [392° F. to 446° F.].

10. The method as recited in claim 9 wherein the exhaust gas is at a temperature greater than 180° C. [356° F.].

11. The method as recited in claim 1 wherein the urea-water solution heat exchanger is integrated into a cooling circuit or into a water cooling jacket of the crankcase.

12. A method for the purification of diesel engine exhaust gases, comprising:
a) passing an exhaust gas to be purified through a diesel oxidation catalyst for oxidation of residual gaseous hydrocarbons and carbon monoxide in order to form carbon dioxide and for an at least proportional oxidation of nitrogen monoxide contained in the exhaust gas in order to form nitrogen dioxide;
b) adding a urea-water solution that has been preconditioned in the engine is added to the exhaust gas resulting from step a) and ammonia is released from the added urea through thermolysis and hydrolysis, the preconditioned urea-water solution having been heated up to 80° C. to 90° C. [176° F. to 194° F.] in the engine temperature lower than conventional metering methods, in which the temperature is 200° C. to 230° C. [392° F. to 446° F.], the exhaust gas being at a temperature greater than 180° C. [356° F.], the urea-water solution being preconditioned by using an amount of heat from the engine such that the heat from the exhaust gas and the amount heat from the engine is sufficient to completely convert the urea-water solution into the gas phase and release ammonia;
c) passing the exhaust gas resulting from step b) through an SCR catalytically activated particulate filter in order to reduce the particles contained in the exhaust gas as well as the nitrogen oxides contained in the exhaust gas; and
d) passing the exhaust gas resulting from step c) through a selective ammonia slip catalyst in order to reduce the residual contents of ammonia.

* * * * *